(12) United States Patent  
Song et al.

(10) Patent No.: US 10,338,877 B2
(45) Date of Patent: Jul. 2, 2019

(54) ELECTRONIC DEVICE AND COMMUNICATION SYSTEM HAVING THE SAME

(71) Applicant: LG ELECTRONICS INC., Seoul (KR)

(72) Inventors: Hyojin Song, Seoul (KR); Dongyoung Lee, Seoul (KR); Soonbo Han, Seoul (KR); Sangjo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 15/033,840

(22) PCT Filed: Oct. 27, 2014

(86) PCT No.: PCT/KR2014/010129
§ 371 (c)(1),
(2) Date: May 2, 2016

(87) PCT Pub. No.: WO2015/064984
PCT Pub. Date: May 7, 2015

(65) Prior Publication Data
US 2016/0266863 A1    Sep. 15, 2016

(30) Foreign Application Priority Data

Nov. 1, 2013 (KR) .................. 10-2013-0132363

(51) Int. Cl.
*G06F 3/14*    (2006.01)
*G06F 3/0481*  (2013.01)
(Continued)

(52) U.S. Cl.
CPC ........ *G06F 3/1454* (2013.01); *G06F 3/04817* (2013.01); *G06F 3/04845* (2013.01);
(Continued)

(58) Field of Classification Search
CPC . G06F 3/1454; G06F 17/2247; G06F 3/04847
See application file for complete search history.

(56) References Cited

U.S. PATENT DOCUMENTS 5,629,714 A * 5/1997 Nishitani .............. G06F 3/1454
345/2.3
6,563,913 B1 * 5/2003 Kaghazian ........... G06Q 10/107
379/88.17

(Continued)

FOREIGN PATENT DOCUMENTS

WO    WO 2011/062952 A2    5/2011

*Primary Examiner* — Nitin Patel
*Assistant Examiner* — Robert M Stone
(74) *Attorney, Agent, or Firm* — Birch, Stewart, Kolasch & Birch, LLP

(57) ABSTRACT

An electronic device including a wireless communication processor configured to wirelessly communicate with at least one other electronic device; a display; and a controller configured to execute a web application of a web browser installed on the electronic device, display an execution screen of the web application on the display, extract a web code of the web application associated with the execution screen, and transmit the extracted web code to the at least one other electronic device through the wireless communication unit such that screen information related to the execution screen is displayed on a display of the at least one other electronic device using the web code without executing a corresponding web application on the at least one other electronic device.

14 Claims, 10 Drawing Sheets

(51) Int. Cl.
   *G06F 3/0484*    (2013.01)
   *G06F 3/0488*    (2013.01)
   *G06F 17/22*     (2006.01)
   *G09G 5/12*      (2006.01)
   *H04W 4/21*      (2018.01)
   *H04W 88/02*     (2009.01)

(52) U.S. Cl.
   CPC ...... *G06F 3/04847* (2013.01); *G06F 3/04883* (2013.01); *G06F 17/2247* (2013.01); *G09G 5/12* (2013.01); *H04W 4/21* (2018.02); G09G 2354/00 (2013.01); G09G 2370/16 (2013.01); H04W 88/02 (2013.01)

(56) References Cited

U.S. PATENT DOCUMENTS

| | | | |
|---|---|---|---|
| 2005/0219225 A1* | 10/2005 | Dunn | G09B 5/02 345/173 |
| 2006/0031779 A1 | 2/2006 | Theurer et al. | |
| 2007/0044028 A1* | 2/2007 | Dunn | G06F 3/03547 715/761 |
| 2011/0010534 A1* | 1/2011 | Lee | G06F 19/3418 713/150 |
| 2011/0181492 A1* | 7/2011 | Soeda | G06F 3/1454 345/1.1 |
| 2012/0144347 A1* | 6/2012 | Jo | G06F 3/04883 715/863 |
| 2012/0297466 A1 | 11/2012 | Li | |
| 2013/0054679 A1 | 2/2013 | Jooste | |
| 2013/0078904 A1* | 3/2013 | Yang | G06F 3/1454 455/3.06 |
| 2013/0138770 A1 | 5/2013 | Kim et al. | |
| 2014/0002471 A1* | 1/2014 | Yeo | G06T 5/00 345/581 |
| 2014/0018053 A1* | 1/2014 | Cho | G06F 3/0488 455/418 |
| 2014/0104138 A1* | 4/2014 | Brown | G06F 3/1423 345/1.1 |
| 2014/0223285 A1* | 8/2014 | Yoon | G06F 17/2247 715/234 |
| 2014/0240445 A1* | 8/2014 | Jaynes | G06F 3/1454 348/14.07 |
| 2014/0359493 A1* | 12/2014 | Hong | G06F 3/1454 715/761 |
| 2015/0061970 A1* | 3/2015 | Kim | G06F 3/1454 345/2.3 |
| 2015/0067534 A1* | 3/2015 | Choi | G06F 3/0482 715/752 |
| 2015/0082241 A1* | 3/2015 | Kang | G06F 3/04845 715/803 |
| 2015/0128073 A1* | 5/2015 | Ahn | G06F 3/0488 715/759 |
| 2016/0117141 A1* | 4/2016 | Ro | G06F 3/1454 715/748 |

* cited by examiner

ELECTRONIC DEVICE AND COMMUNICATION SYSTEM HAVING THE SAME

TECHNICAL FIELD

This specification relates to an electronic device capable of performing communication with another electronic device, and a communication system between electronic devices.

BACKGROUND ART

Electronic devices are devices which are portable and have at least one of voice and telephone call functions, information input and/or output functions, a data storage function and the like. As it becomes multifunctional, the mobile terminal can be allowed to capture still images or moving images, play music or video files, play games, receive broadcast and the like, so as to be implemented as an integrated multimedia player.

Many efforts are undergoing to support and enhance various functions as such multimedia player in view of hardware or software improvements. For example, a user interface environment is provided in order for users to easily and conveniently retrieve or select functions.

With the increase in the functions of the electronic devices, the electronic devices are capable of extending functions through communication with other electronic devices.

DISCLOSURE OF INVENTION

Technical Problem

Therefore, an aspect of the detailed description is to provide an electronic device, capable of extending functions thereof by outputting to another electronic device screen information related to an execution screen of an application installed therein, and a communication system having the same.

Another aspect of the detailed description is to provide a communication system having a platform allowing for communications between electronic devices.

Solution to Problem

To achieve these and other advantages and in accordance with the purpose of this specification, as embodied and broadly described herein, there is provided an electronic device including a wireless communication unit that is configured to allow for communication with another electronic device, a display unit that is configured to display an execution screen of a web application, and a controller that is configured to extract a web code of the web application associated with the execution screen, and transmit the extracted web code to the another electronic device through the wireless communication unit such that screen information related to the execution screen can be output on the another electronic device using the web code.

In accordance with one exemplary embodiment disclosed herein, the execution screen may be divided into a plurality of areas including information having different attributes from one another, and the web code may include a web code corresponding to at least one area of the plurality of areas.

The controller, when a user selects at least one area from the plurality of areas, may extract a web code corresponding to the selected at least one area, and transmit the extracted web code to the another electronic device through the wireless communication unit.

The selected at least one area may be highlighted to be distinguishable from the other areas.

Also, the display unit may display an icon corresponding to the another electronic device communicatable, and the selection of the web code to transmit may be carried out by a preset type of touch with respect to the selected at least one area and an icon corresponding to the another device.

The preset type of touch may be a drag touch which starts on the at least one area displayed on the display unit and ends on the icon corresponding to the another electronic device.

Screen information corresponding to the transmitted web code may disappear from the display unit when the web code corresponding to the at least one area is transmitted to the another electronic device.

Meanwhile, an output state of screen information corresponding to the transmitted web code may be maintained on the display unit even though the web code corresponding to the at least one area is transmitted to the another electronic device.

The controller, when at least part of the execution screen displayed on the display unit changes, may transmit a web code corresponding to the changed execution screen to the another electronic device through the wireless communication unit, such that screen information corresponding to the changed execution screen is displayed on the another electronic device.

The changed execution screen may be limited to an area selected by the user among the plurality of areas.

While the screen information is output on the another electronic device using the web code, the controller may control the wireless communication unit such that at least one area of the plurality of areas constructing the screen information output on the another electronic device is selected, and the display unit may output a list of areas transmittable from the another electronic device.

In accordance with another exemplary embodiment disclosed herein, the web code may be a web code which is executable on a web browser provided in the another electronic device.

The web code may be one of an HTML code, a Java Script code and a CCS code.

To achieve these and other advantages and in accordance with the purpose of this specification, as embodied and broadly described herein, there is provided a communication system configured to allow a first electronic device and a second electronic device to communicate with each other. The first electronic device may include a first wireless communication unit that is configured to communicate with the second electronic device, a first display unit that is configured to display an execution screen of a web application, and a first controller that is configured to extract a web code of the web application associated with the execution screen and control the first wireless communication unit to transmit the extracted web code to the second electronic device. Also, the second electronic device may include a second wireless communication unit that is configured to communicate with the first wireless communication unit so as to receive the web code transmitted from the first electronic device, a second controller that is configured to execute the transmitted web code on a web browser, and a second display unit that is configured to output screen information related to the executed web code.

In accordance with one exemplary embodiment disclosed herein, the web browser may be provided at a platform of each of the first and second electronic devices.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Advantageous Effects of Invention

In accordance with the present disclosure, an electronic device may extract a web code associated with an execution screen of a web application and transmit the extracted web code to another electronic device. The another electronic device may thus execute the transmitted web code on a web browser so as to output screen information corresponding to the execution screen.

Therefore, even though the web application has not been installed in the another electronic device, the web application can be executed on the another electronic device, and the execution screen of the web application can be synchronized with electronic devices in real time. Also, a web browser for allowing such communication and cooperation may be installed at a platform of each electronic device, thereby extending default functions of those electronic devices.

BRIEF DESCRIPTION OF DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

BEST MODE FOR CARRYING OUT THE INVENTION

Description will now be given in detail of preferred configurations of an electronic device and a communication system having the same according to the present invention, with reference to the accompanying drawings.

For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Electronic devices disclosed herein may be implemented using a variety of different types of terminals. Examples of such terminals include mobile terminals, such as tablet PCs, smart phones, notebook computers, digital broadcast terminals, Personal Digital Assistants (PDAs), Portable Multimedia Players (PMPs), navigators, slate PCs, ultra books and the like, and stationary terminals, such as digital TVs, desktop computers and the like.

Figure 1:
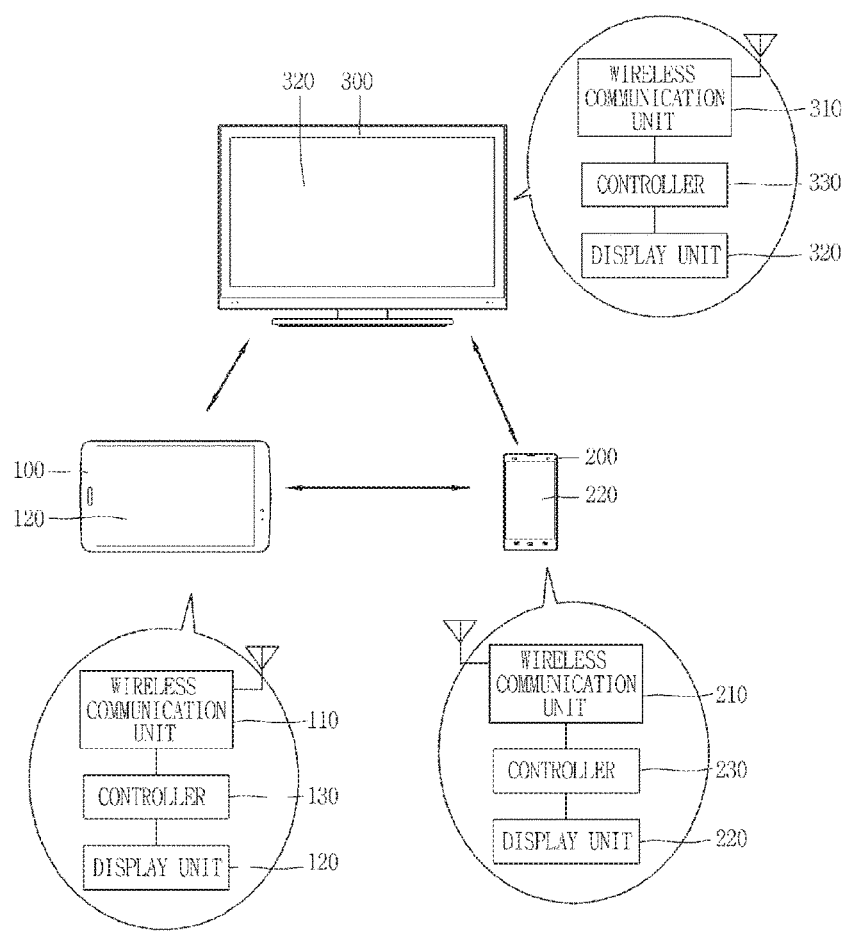
FIG. 1 is a conceptual view of a communication system in accordance with one exemplary embodiment disclosed herein.

FIG. 1 is a conceptual view of a communication system in accordance with one exemplary embodiment disclosed herein.

As illustrated in FIG. 1, a communication system is a system which allows electronic devices 100, 200 and 300 to communicate together for transferring information. If using this system, functions of the electronic devices 100, 200 and 300 may be extendable. FIG. 1 exemplarily illustrates a communication system, in which one of the electronic devices 100, 200 and 300 is able to communicate with at least one of the other electronic devices 100, 200 and 300.

Each of the electronic devices 100, 200 and 300 includes a wireless communication unit 110, 210, 310, a display unit 120, 220, 320, and a controller 130, 230, 330. Meanwhile, at least one electronic device 100 has a web application which is installed therein and executed on a web browser. Screen information related to an execution screen of the web application may be output to other electronic devices 200 and 300 through the communication system.

The wireless communication unit 110, 210, 310 is configured to transmit and receive wireless signals to and from the wireless communication unit 110, 210, 310 of another device 100, 200, 300. A connection among the wireless communication units 110, 210, 310 may be implemented in various ways. For example, an infrastructure mode which is a connection through an access point (AP) of a server, an Ad-hoc mode which is a direct connection between Wi-Fi modules, or the like may be used. The wireless communication unit 110, 210, 310 may be configured to transmit and receive the wireless signal using a short-range communication module, for example, Bluetooth module, provided therein.

The display unit 120, 220, 320 outputs (displays) information processed in the electronic device 100, 200, 300. As will be explained later, while a web application is executed on a web browser, the display unit 120 outputs the corresponding execution screen.

The display unit 120, 220, 320 may include at least one of a liquid crystal display (LCD), a thin film transistor-liquid crystal display (TFT LCD), an organic light-emitting diode (OLED), a flexible display, a 3D display and an e-ink display.

Here, if the display unit 120, 220, 320 and a touch sensitive sensor (referred to as a touch sensor) have a layered structure therebetween, the display unit 120, 220, 320 may be used as an input device as well as an output device. The touch sensor may be implemented as a touch film, a touch sheet, a touch pad, and the like.

The touch sensor may be configured to convert changes of a pressure applied to a specific part of the display unit 120, 220, 320, or a capacitance occurring from a specific part of the display unit 120, 220, 320, into electric input signals. Also, the touch sensor may be configured to sense not only a touched position and a touched area, but also touch pressure.

When touch inputs are sensed by the touch sensors, corresponding signals are sent to a touch controller. The touch controller processes the received signals, and then transmits corresponding data to the controller 130, 230, 330. Accordingly, the controller 130, 230, 330 may sense which region of the display unit 120, 220, 320 has been touched.

The controller 130, 230, 330 controls overall operations of the electronic device 100, 200, 300. For example, the controller 130, 230, 330 controls the wireless communication 110, 210, 310 to execute wireless communication with another electronic device 100, 200, 300 or controls the display unit 120, 220, 320 to perform control and processing associated with output of visual information. Also, the controller 130, 230, 330 may perform a pattern recognition processing so as to recognize an input carried out on the touch screen.

Hereinafter, description will be given in more detail of an electronic device 100 capable of extending functions thereof by outputting screen information related to an execution screen of a web application installed therein to another electronic device 200, 300, and a communication system having the same.

Figure 2:
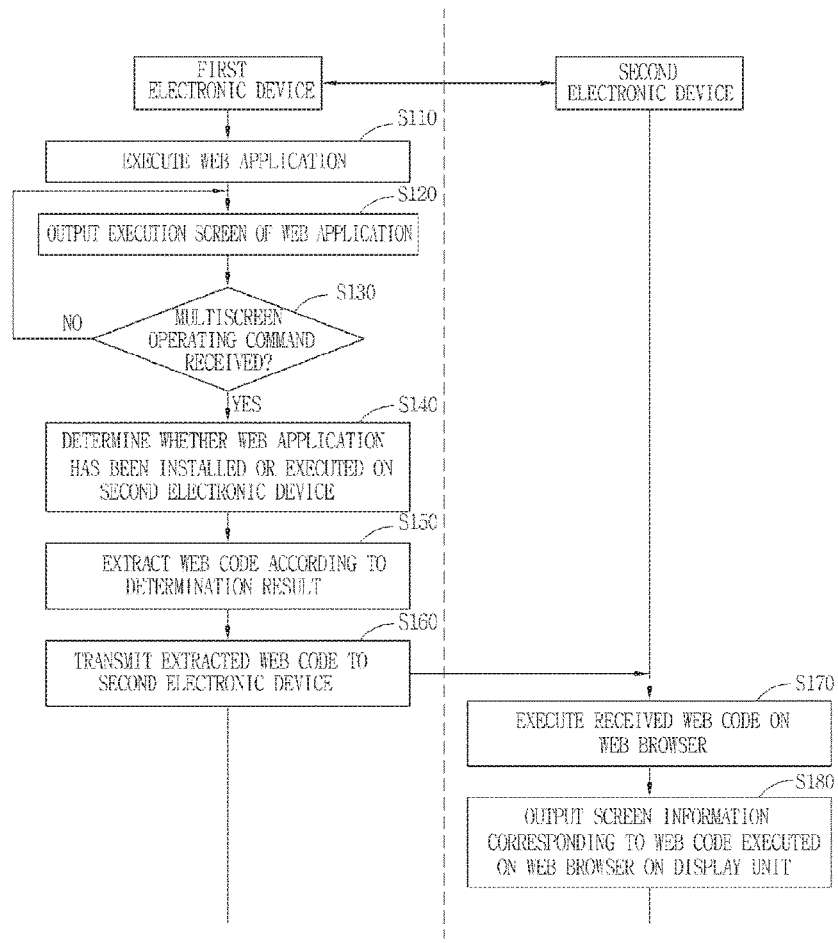
FIG. 2 is a flowchart illustrating a mechanism of outputting screen information related to an execution screen of a web application, which is run on a first electronic device, to a second electronic device.

FIG. 2 is a flowchart illustrating a mechanism in which screen information related to an execution screen of a web application, which is run on a first electronic device 100, is output on a second electronic device 200.

As illustrated in FIG. 2, the first electronic device 100 has a web application which is an operating software based on a web browser. The web browser and the web application are provided as defaults at a platform of the first electronic device 100 or installed according to a user selection. An execution screen of the web application executed on the web browser is displayed on the display unit 120 (S110, S120).

Meanwhile, this embodiment is given under assumption that the web browser has been installed but the web application has not been installed. Of course, the second electronic device 200 may also have a web application installed therein.

To allow screen information related to the execution screen to be displayed on the display unit 220 even when the web application has not been installed in the second electronic device 200, the first and second electronic devices 100 and 200 support the following function. The function may be referred to as a multiscreen function for convenience in the way that visual information can be cooperatively output to a plurality of electronic devices.

When a multiscreen operating command is received (S130), the controller 130 of the first electronic device 100 determines whether or not a web application has been installed or executed on the second electronic device 200 (S140). Here, the first electronic device 100 may request for information related to the second electronic device 200 [for example, an installation or non-installation of the web application, presence or non-presence of a framework constructing the web application, etc.].

The controller 130 extracts a web code WC according to the determination result (S150).

For example, if the web application has not been installed or executed before in the second application 200, the controller 130 extracts a web code WC associated with the execution screen and a web code WC constructing the framework.

Meanwhile, if the web application has been installed or executed before in the second electronic device 200, the web codes extracted by the controller 130 may not include the web code WC constructing the framework.

In such a manner, the screen information related to the execution screen of the web application, which is displayed on the display unit 120, may be output on the display unit 220 using a less number of web codes WC, thereby improving efficiency.

In the meantime, the extracted web code WC refers to a web code which is executable on the web browser provided in the second electronic device 200, and may be one of an HTML code, a JavaScript code, and a CCS code. Also, the extracted web code WC may be packaged along with additional information (preEval, appName, etc.) so as to be transmitted to the second electronic device 200 (S160). The controller 130 controls the wireless communication unit 110 to transmit the extracted web code WC to the second electronic device 200.

The wireless communication unit 210 of the second electronic device 200 receives the web code WC from the first electronic device 100 by communicating with the wireless communication unit 110 of the first electronic device 100. The controller 230 executes the received web code WC on the web browser (S170), and the display unit 220 displays screen information related to the web code executed on the web browser (S180).

Therefore, even if the web application has not been installed in the second electronic device 200, the display unit 220 may output the screen information related to the execution screen output on the display unit 120. The screen information may be visual information which is the same/like to at least part of the execution screen.

The mechanism uses the characteristic of the web code WC executed on the web browser without a compile process. Various user interfaces can be implemented if the web code WC to transmit to the second electronic device 200 is appropriately controlled.

Meanwhile, a platform of each of the first and second electronic devices 100 and 200 has a web browser, which allows for such communication and cooperative operation, installed therein as a default program. This may extend the default function of the electronic device 100, 200 through the communication system.

Hereinafter, examples of user interfaces which can be implemented in the present application will be described in more detail.

Figure 3:
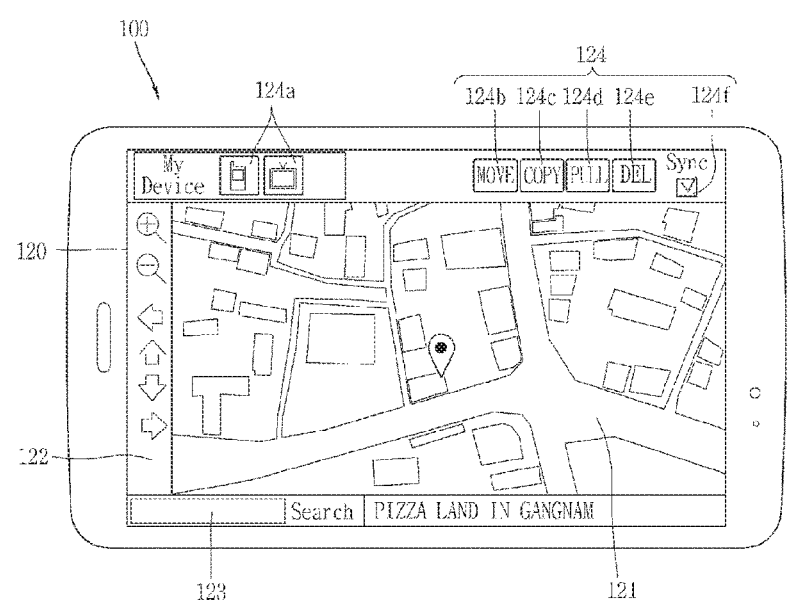
FIG. 3 is a conceptual view illustrating one example of the execution screen of the web application run on the first electronic device.

FIG. 3 is a conceptual view illustrating one embodiment of the execution screen of the web application run on the first electronic device 100.

As illustrated in FIG. 3, an execution screen of a web application is divided into a plurality of areas including information having different attributes from one another. The controller 130 is configured to extract a web code WC corresponding to at least one area of the plurality of areas.

For example, as illustrated in FIG. 3, an execution screen of a web application which provides location information may include, according to its functions, a map area 121 displaying a location, a controller area 122 adjusting a location, a search area 123 searching for a location. Meanwhile, as will be explained later with reference to FIGS. 8A to 8C, the execution screen of the web application may be divided based on a graphic object.

While a map of a specific region is displayed on the map area 121, when the controller area 122 is manipulated, the map displayed on the map area 121 may be moved, enlarged or reduced, in response to the manipulation. Also, when a predetermined search condition is input onto the search area 123, a search result may be displayed and also separately displayed on the map area 121.

Meanwhile, the display unit 120 may display a control area 124 on which various functions, states and the like of the web application are output. FIG. 3 exemplarily illustrates an icon 124a corresponding to other communicatable electronic devices and icons indicating functions cooperative with other electronic devices [for example, move 124b, copy 124c, pull 124d, del 124e and sync 124f] are displayed on an upper portion of the display unit 120.

Hereinafter, description will be given of implementable user interfaces, exemplarily referring to functions cooperative with other electronic devices.

Figure 4:
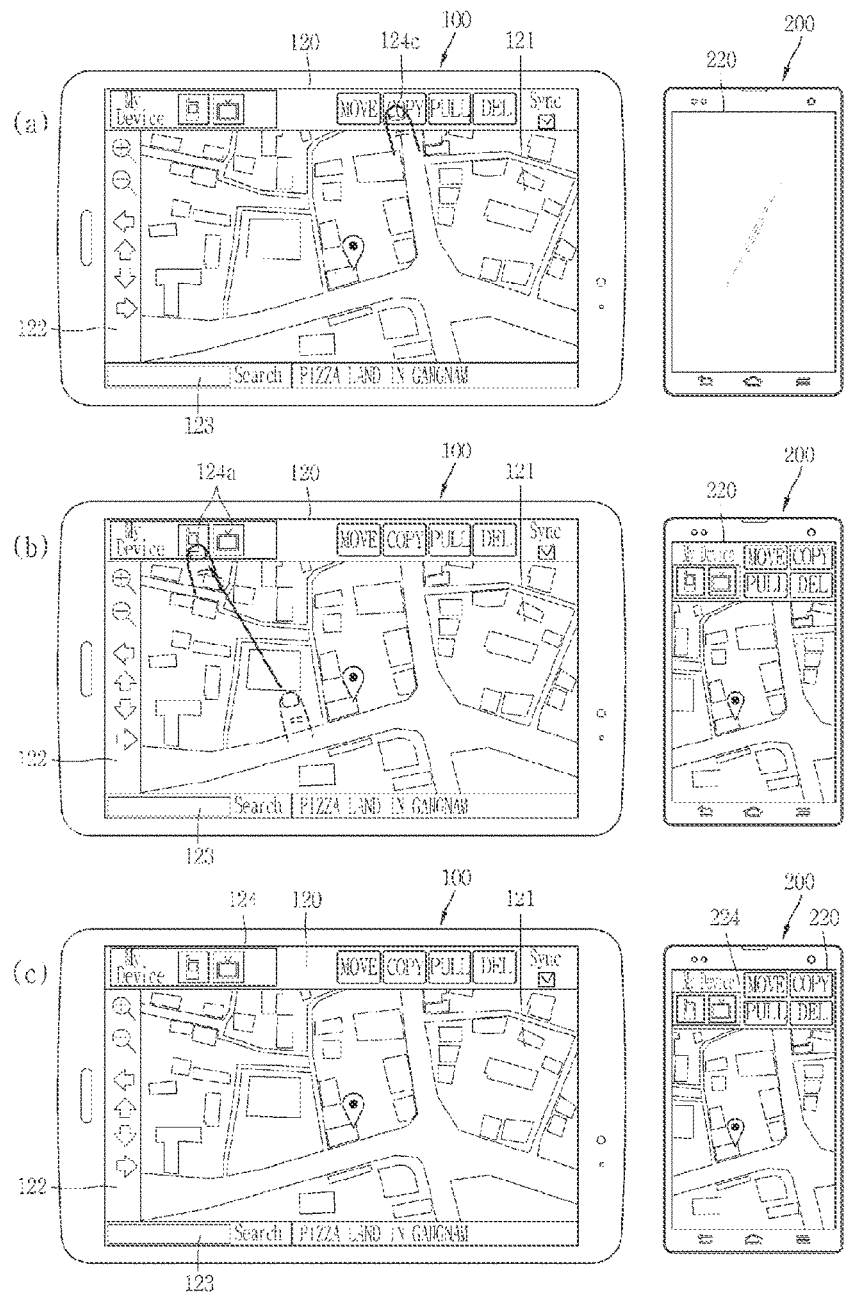
FIG. 4 is a conceptual view illustrating one example in which the screen information related to the execution screen of FIG. 3 is output on the second electronic device.

FIG. 4 is a conceptual view illustrating one embodiment in which the screen information related to the execution screen of FIG. 3 is output on the second electronic device 200.

As illustrated in (a) of FIG. 4, while a web application is executed, the controller 130 is set to a state for receiving a control command input thereto. The control command may be generated by a touch input (including a proximity touch) applied to the display unit 120 implemented as a touch screen, or an input applied by a separate manipulation unit (for example, a keyboard, a remote controller, etc.).

(a) of FIG. 4 exemplarily illustrates that a user selects the icon 124c, which is associated with a function (copy) of outputting screen information related to at least one area of the execution screen to the display unit 220 of the second electronic device 200.

Meanwhile, the second electronic device 200 is set to a state of being communicatable with the first electronic device 100. As illustrated, when the second electronic device 200 is in a standby mode even if the display unit 220 is in a turn-off state, the second electronic device 200 may receive a web code WC transmitted by the first electronic device 100.

Afterwards, referring to (b) of FIG. 4, when the user selects at least one area of the plurality of areas, the controller 130 extracts a web code WC corresponding to the selected at least one area, and transmits the extracted web code WC to the second electronic device 200 through the wireless communication unit 110. (b) of FIG. 4 exemplarily illustrates that the map area 121 is selected and a web code WC constructing visual information related to the map area 121 is transmitted to the second electronic device 200.

The selection of the web code WC to transmit may be carried out by a preset type of touch with respect to the selected at least one area [for example, the map area 121 in this drawing] and the icon 124a corresponding to the second electronic device 200. The preset type of touch, for example, may be a drag touch which starts on the at least one area output on the display unit 120 and ends on the icon 124a corresponding to the second electronic device 200. The drag touch may be activated when a touch applied to the at least one area is maintained for a predetermined period of time. When the drag touch is activated, a vibration or sound may be generated such that the user can intuitively recognize the activation of the drag touch in a visible or audible manner.

Meanwhile, when the user selects the at least one area, the user may be confused whether or not a desired area has been properly selected. Therefore, the controller 130 may highlight the selected at least one area to be distinguishable from the other areas.

The highlighting for the selected at least one area may be implemented in various visual manners, such as changing color, flickering, marking an edge dark, and the like. Meanwhile, while the drag touch is applied, the selected at least one area may be moved to the icon 124a corresponding to the second electronic device 200. Also, a visual effect that the selected at least one area is getting smaller in size like being sucked into the icon 124a may be provided during the movement.

When the web code WC corresponding to the at least one area selected in the first electronic device 100 is transmitted to the second electronic device 200, as illustrated in (c) of FIG. 4, screen information related to the selected at least one area is output on the display unit 220 of the second electronic device 200. The screen information may be the same/like screen to the execution screen of the selected at least one area. For example, the same map as the map output on the map area 121 may be output on the display unit 120 of the second electronic device 200.

Meanwhile, a control area 224 for displaying an icon corresponding to other communicatable electronic devices, and icons indicating functions cooperative with other electronic devices [move, copy, pull, delete, sync, etc.] may be displayed on an upper portion of the display unit 220. The map output on the display unit 220 of the second electronic device 200 may be output to occupy most of the display unit 220. Here, when a web code WC corresponding to another area is transmitted afterwards and then related screen information is output, the previously-output map may be displayed in a reduced form.

Meanwhile, even if the web code WC corresponding to the at least one area is transmitted to the second electronic device 200, an output state of the execution screen corresponding to the transmitted web code WC may be maintained on the display unit 120 of the first electronic device 100. That is, the execution screen which is being output on the display unit 120 of the first electronic device 100 with including the map output on the map area 121 does not change.

In this embodiment, the cooperative relationship between the execution screen and the screen information may depend on synchronization or non-synchronization. If the synchronization has not been set, the execution screen and the screen information may be displayed independent of each other. For example, even if the execution screen displayed on the display unit 120 of the first electronic device 100 changes, the screen information displayed on the display unit 220 of the second electronic device 200 does not change.

Hereinafter, description will be given of a cooperation mechanism between the execution screen and the screen information when the synchronization has been set.

Figure 5:
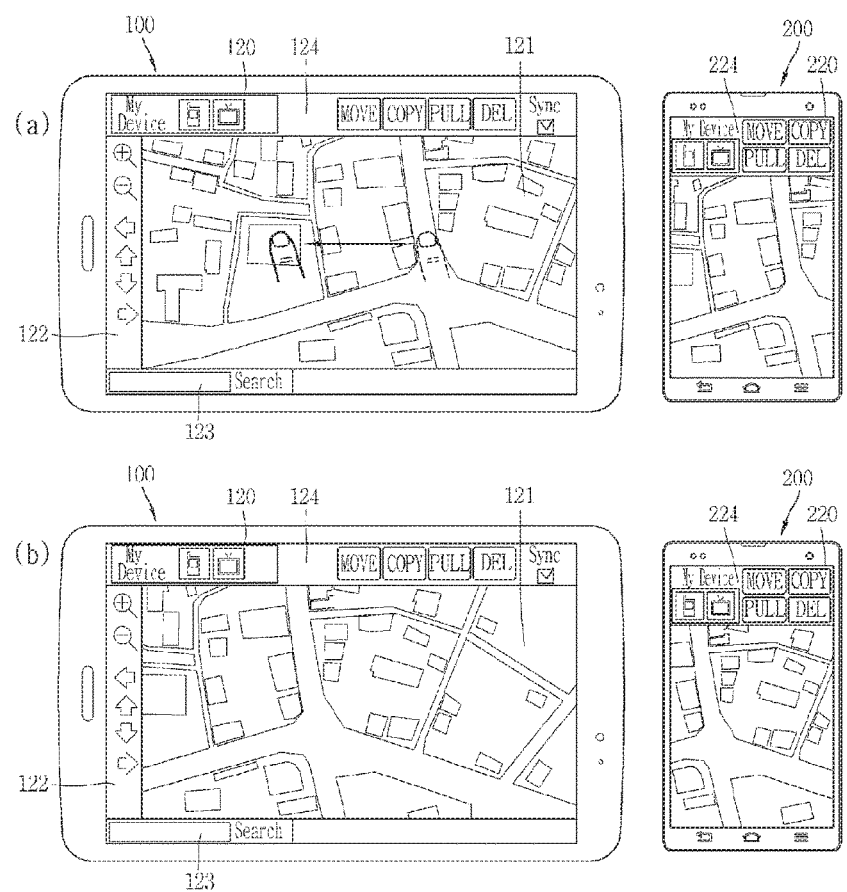
FIG. 5 is a conceptual view illustrating one example in which the execution screen and the screen information output on the first and second electronic devices of FIG. 4, respectively, are cooperative with each other.

FIG. 5 is a conceptual view illustrating one embodiment in which the execution screen and the screen information output on the first and second electronic devices 100 and 200 of FIG. 4, respectively, cooperate with each other.

As illustrated in FIG. 5, when at least part of the execution screen displayed on the display unit 120 is changed, the controller 130 of the first electronic device 100 extracts a web code WC corresponding to the changed execution screen and transmits the extracted web code WC to the second electronic device 200 through the wireless communication unit 110. That is, the controller 130 updates the web code WC corresponding to the changed execution screen and transmits the updated web code WC to the second electronic device 200.

Here, the updated web code WC may include less information than a web code WC which has been first transmitted to the second electronic device 200. For example, the web code WC, which has first been transmitted to the second electronic device 200 prior to the screen information related to the web application being output on the second electronic device 200, may include not only the web code WC corresponding to the selected at least one area, but also the web code WC constructing the framework of the web application.

After the screen information related to the web application is output on the second electronic device 200, the web code WC constructing the framework may be extruded from web codes which are transmitted for synchronization or additional output of another part of the execution screen. This may allow for cooperation of the execution screen of the web application using less web codes WC, thereby enhancing efficiency.

The controller 230 of the second electronic device 200 receives the updated web code WC and executes the received web code WC on its web browser. Accordingly, screen information corresponding to the changed execution screen is displayed on the display unit 220.

When the controller 130 of the first electronic device 100 continuously updates the web code WC with short time intervals and transmits the updated web code WC to the second electronic device 200, the change of the execution screen may be reflected on the screen information in real time.

Here, the changed execution screen may be limited to an area selected by the user, among the plurality of areas. For example, as illustrated, when a location of a map output on the map area 121 is changed, the screen information output on the second electronic device 200 is changed accordingly. On the other hand, if there is no change in visual information which is being output on the map area 121 even though a search condition or result is displayed on the search area 123 of the display unit 120, the screen information which is being output on the display unit 220 of the second electronic device 200 does not change.

Figure 6:
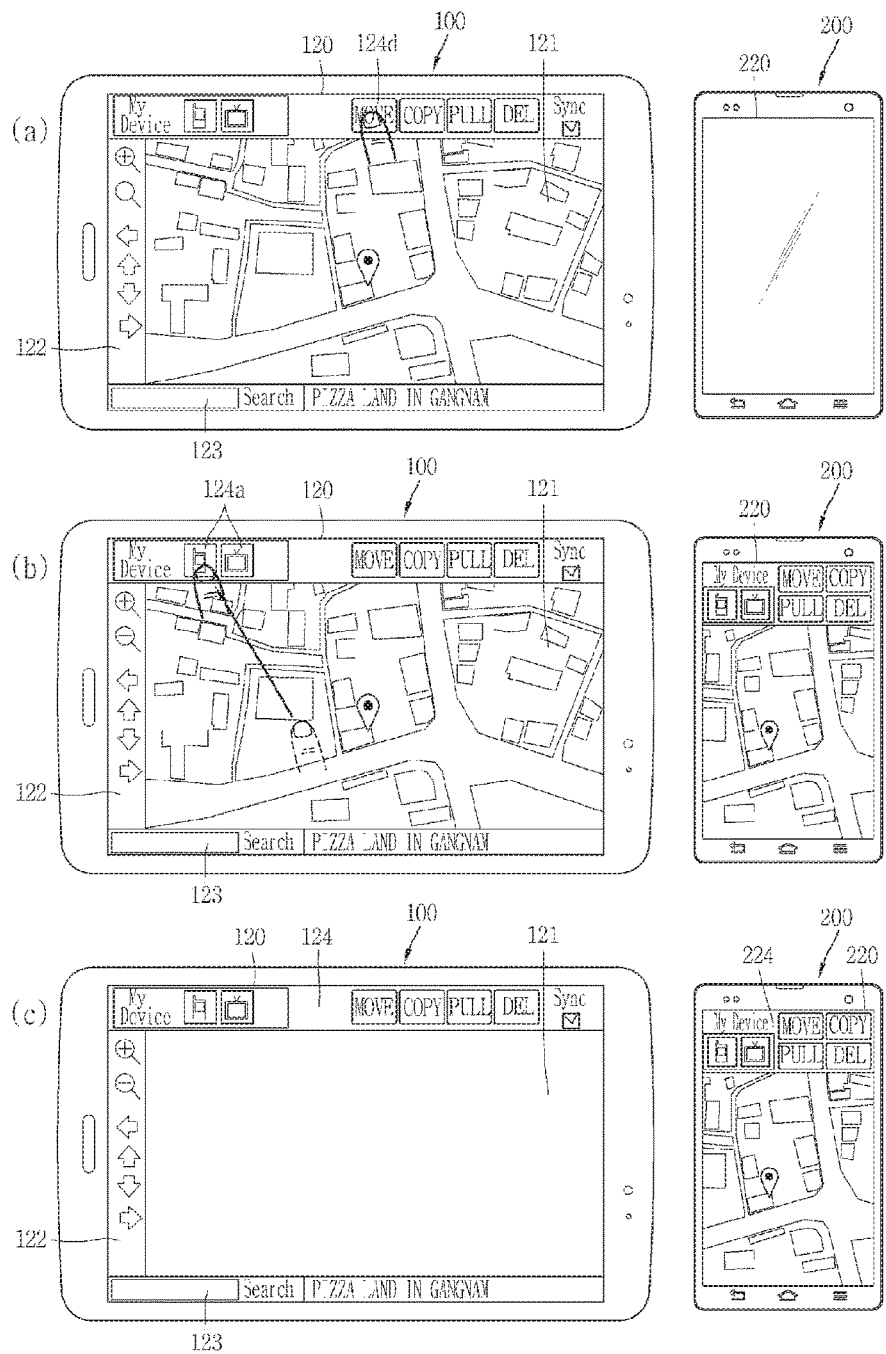
FIG. 6 is a conceptual view illustrating another embodiment in which the screen information related to the execution screen of FIG. 3 is output on the second electronic device.

FIG. 6 is a conceptual view illustrating another embodiment in which the screen information related to the execution screen of FIG. 3 is output to the second electronic device 200.

FIG. 6 exemplarily illustrates that a user selects an icon 124b, which is associated with a function (move) of moving screen information related to at least one area of the execution screen to the display unit 220 of the second electronic device 200 for output is selected.

When at least one area is selected by the user from the plurality of areas, the controller 130 extracts a web code WC corresponding to the selected at least one area and transmits the extracted web code WC to the second electronic device 200 through the wireless communication unit 110. For example, similar to the foregoing embodiment, a case where the map area 121 is selected and the web code constructing the map area 121 is transmitted to the second electronic device 200 may be taken into account.

Here, the transmitted web code WC is executed on the web browser and the screen information corresponding to the execution screen, namely, the selected at least one area is output to the display unit 220. The screen information may be the same screen as the screen information of the selected at least one area. For example, the same map as the map output on the map area 121 may also be output on the display unit 220 of the second electronic device 200.

On the other hand, visual information corresponding to the transmitted web code WC disappears from the display unit 120 of the first electronic device 100. That is, the visual information which is output on the selected at least one area is not output any more. Hence, as illustrated, the map output on the map area 121 may disappear and a background image of the map area 121 may appear.

Figure 7:
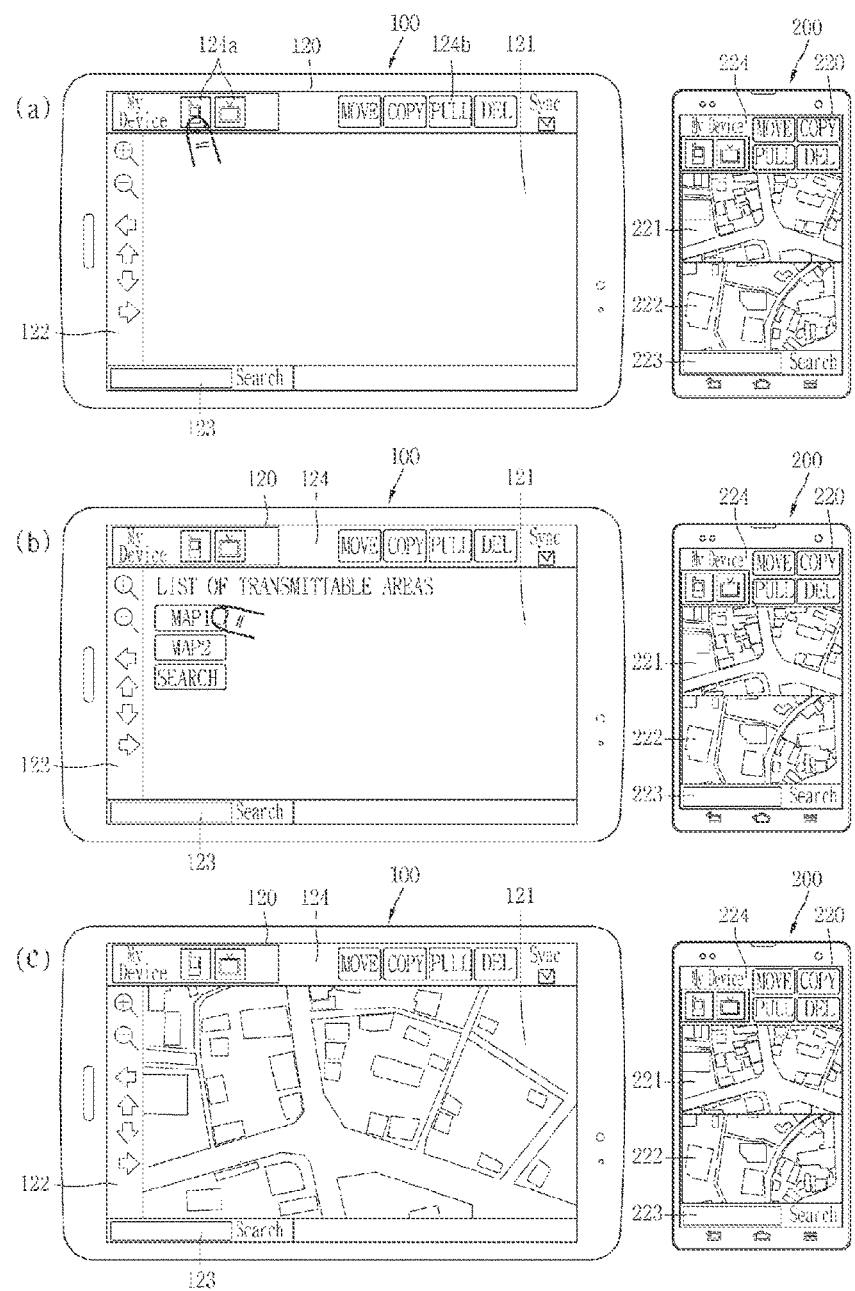
FIG. 7 is a conceptual view illustrating one embodiment in which screen information related to the second electronic device is output on the first electronic device.

FIG. 7 is a conceptual view illustrating one embodiment in which screen information related to the second electronic device 200 is output on the first electronic device 100.

FIG. 7 illustrates an exemplary embodiment under assumption that screen information has been output on the second electronic device 200 using the web code WC transmitted from the first electronic device 100. As illustrated in (a) of FIG. 7, to implement this function, an icon 124a associated with the second electronic device 200 and an icon 124d associated with a function of pulling the screen information output on the second electronic device 200 to the first electronic device 100 are selected.

In response to the selection, the controller 130 of the first electronic device 100 controls the wireless communication unit 110 such that at least one area of the plurality of areas, which construct the screen information output on the second electronic device 200, can be selected. The wireless communication unit 110 receives a list of areas transmittable through the wireless communication unit 210 of the second electronic device 200. Here, information related to the list may also be transmitted in a form of a web code WC.

Referring to (b) of FIG. 7, the list of transmittable areas [for example, screen information 221 related to a first map, screen information 222 related to a second map, screen information 223 related to search, etc.] from the second electronic device 200 may be output on the display unit 120 of the first electronic device 100. When a specific item is selected from the list, a web code WC corresponding to screen information 221 of the selected item is transmitted to the first electronic device 100. As illustrated in (c) of FIG. 7, visual information corresponding to the web code WC is output on the display unit 120.

The foregoing embodiment illustrates that the screen information of the web application is cooperatively output on the first and second electronic devices 100 and 200, exemplarily using the functions, such as copy, sync, move and pull. Meanwhile, a delete function may be understood as a function of deleting visual information output on a corresponding area.

User interfaces which can be implemented in the present application may not be limited to those embodiments, and other user interfaces can be provided by combinations of those embodiments. For example, while the map is output on the display unit 220 in response to the web code WC corresponding to the map area of the first electronic device 100 being transmitted to the second electronic device 200, when the user carries out a search through the search area 123 of the first electronic device 100, a web code WC corresponding to a search result may be transmitted to the second electronic device 200 so as to be reflected on the map (map change, display of a location on the map, etc.). Also, by using the pull function, the map with the search result reflected thereon may also be output on the display unit 120 of the first electronic device 100.

Hereinafter, description will be given of a mechanism of outputting screen information related to execution screens of a web application, which is executed on several electronic devices in a distributing manner, to another electronic device.

Figure 8A:
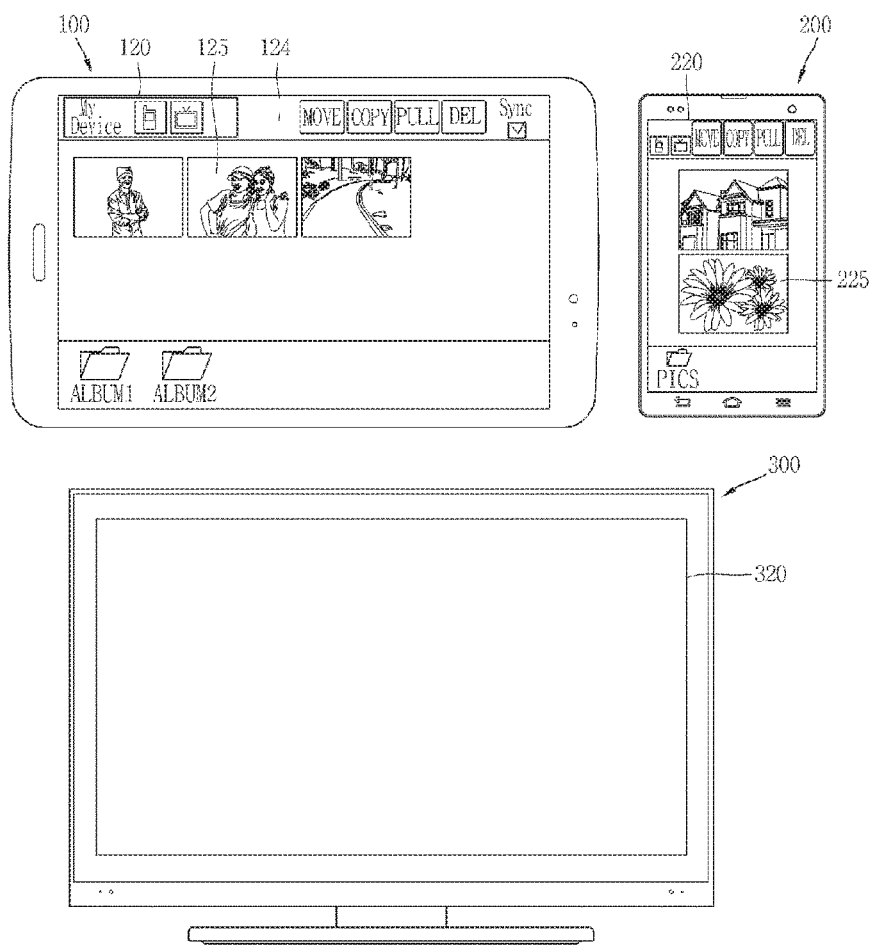
FIGS. 8A to 8C are conceptual views illustrating one embodiment in which screen information related to each execution screen of a web application run on the first and second electronic devices is output on a third electronic device.
Figure 8B:
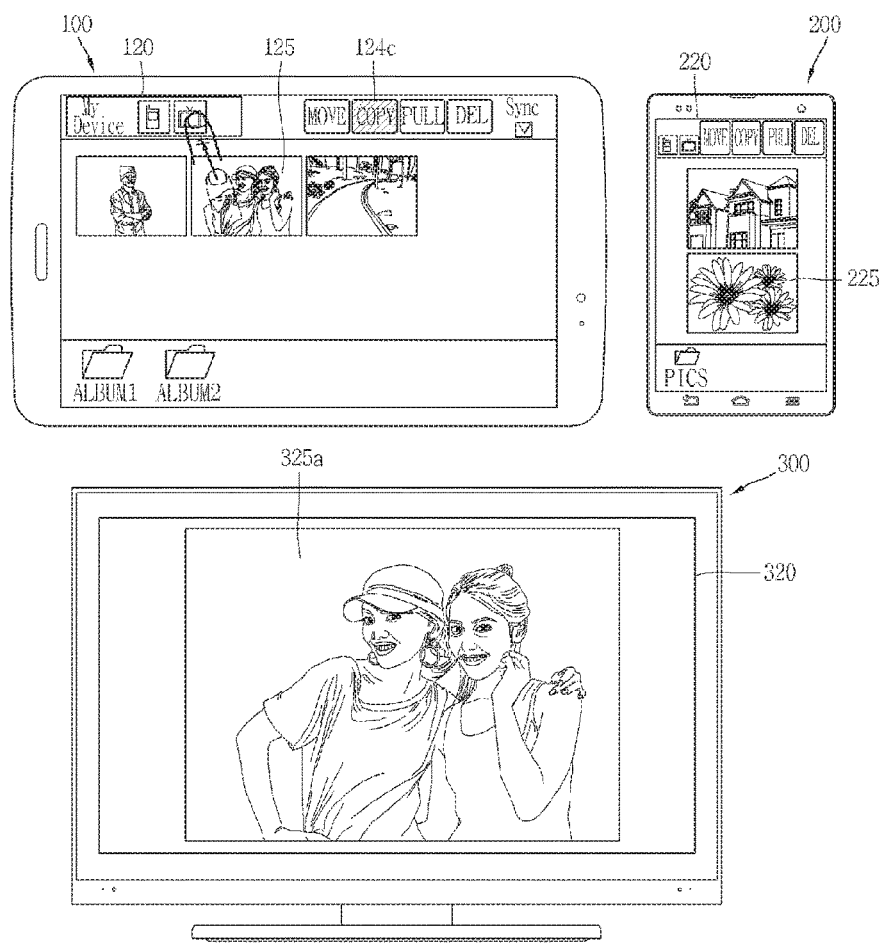
Figure 8C:
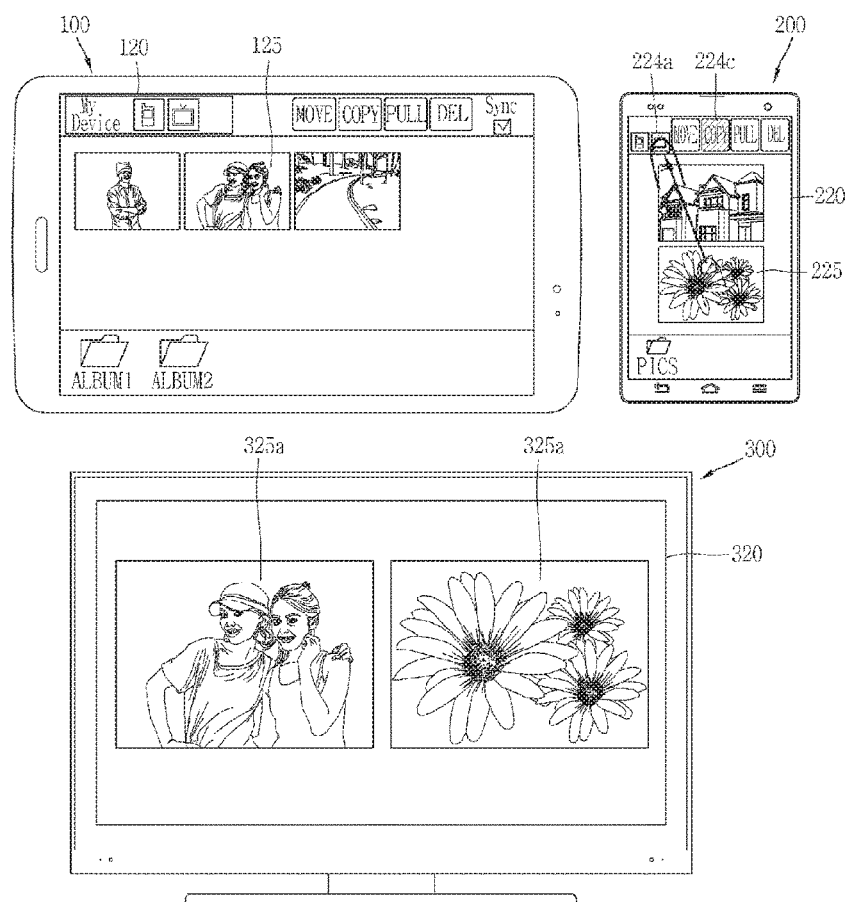

FIGS. 8A to 8C are conceptual views illustrating one example in which screen information related to an execution screen of a web application run on the first and second electronic devices 100 and 200 is displayed on a third electronic device 300.

As illustrated in FIG. 8A, at least one graphic object 125, 225 may be included in each of execution screens of a web application, which is executed on each of the first and second electronic devices 100 and 200. For example, if the web application is an application program of storing pictures (photos, images) in a form of an album, the pictures constructing the album correspond to the graphic objects 125 and 225.

Here, there may be a need of outputting the pictures output on the web application of the first and second electronic devices 100 and 200 to the third electronic device 300. For example, it may be useful to output the pictures, which are displayed on the display unit 120, 220 of each electronic device 100 and 200, to a larger display unit 320 which is provided to the third electronic device 300. According to the present disclosure, even though the web application has not been installed in the third electronic device 300, web codes WC corresponding to the graphic objects 125 and 225 output on the first and second electronic devices 100 and 200 may be transmitted to the third electronic device 300, such that related screen information can be output on the display unit 320.

The mechanism for implementing this is the same/like to the aforementioned. That is, the specific graphic objects 125 and 225 output on the first and second electronic devices 100 and 200 may be displayed on the display unit 320 of the third electronic device 300 using the copy or move function, or screen information output on the display unit 320 of the third electronic device 300 may be deleted on the first and second electronic devices 100 and 200 using the delete function. This may allow for implementing user interfaces of outputting and editing screen information on the third electronic device 300.

Referring to FIGS. 8B and 8C, while a web application is executed, the controllers 130 and 230 are set to a state of receiving control commands, namely, the graphic objects 125 and 225 to transmit. When the user selects at least one graphic object 125, 225, the controller 130, 230 extracts a web code WC corresponding to the selected at least one graphic object 125, 225 and transmits the extracted web code WC to the third electronic device 300 through the wireless communication unit 110, 210.

Those drawings exemplarily illustrate that the specific graphic object 125 of the first electronic device 100 is output on the third electronic device 300 and thereafter the specific graphic object 225 of the second electronic device 200 is also output on the third electronic device 300. Here, the graphic object 125 output on the first electronic device 100 and a graphic object 325*a* output on the third electronic device 300 may have different sizes from each other.

Meanwhile, the graphic object 325*a* output on the third electronic device 300 may be located in a specific size at a specific position of the display unit 320. Afterwards, when another graphic object 325*b* is added, at least one of the position and the size of the graphic object 325*a* may change. For example, a visual effect can be provided in such a manner that the recently-added graphic object 325*b* is disposed to overlap the previously-added graphic object 325*a*, and the previously-added graphic object 325*a* is output in a smaller size such that the recently-added graphic object 325*b* can be more highlighted.

As described above, according to the present disclosure, an electronic device may extract a web code related to an execution screen of a web application and transmit the extracted web code to another electronic device. The another electronic device may then execute the transmitted web code on a web browser to output screen information related to the execution screen.

Therefore, even if the web application has not been installed in the another electronic device, the web application can be executed on the another electronic device, and also the execution screen of the web application can be synchronized with other electronic devices in real time. Also, a web browser which allows for communication and co-operation may be installed at a platform of each of the electronic devices, thereby extending default functions of the electronic devices.

The configurations and methods of the electronic device and the communication system having the same in the aforesaid embodiments may not be limitedly applied, but such embodiments may be configured by a selective combination of all or part of the embodiments so as to implement many variations.

The invention claimed is:

1. An electronic device comprising:
a wireless communication processor configured to wirelessly communicate with at least one other electronic device;
a display; and
a controller configured to:
execute a web application of a web browser installed on the electronic device,
display an execution screen of the web application on the display,
extract a web code of the web application associated with the execution screen, and
transmit the extracted web code to the at least one other electronic device through the wireless communication processor such that screen information related to the execution screen is displayed on a display of the at least one other electronic device using the web code without executing a corresponding web application on the at least one other electronic device,
wherein the controller is further configured to display a move icon for moving the execution screen to the display of the at least one other electronic device, a copy icon for copying the execution screen to the display of the at least one other electronic device, and a pull icon for pulling the screen information displayed on the display of the at least one other electronic device to be displayed on the display of the electronic device, and wherein the controller is further configured to:

receive a list of areas transmittable from the at least one other electronic device to the electronic device among an entire area of a screen displayed on the display of the at least one other electronic device, in response to a touch applied to the pull icon, display the list of the areas, and in response to selecting an item from the list, display visual information corresponding to any one of the areas.

2. The electronic device of claim 1, wherein the controller is further configured to extract the corresponding web code of a selected at least one area.

3. The electronic device of claim 2, wherein the controller is further configured to highlight the selected at least one area from the other areas.

4. The electronic device of claim 2, wherein the controller is further configured to:

display an icon corresponding to the at least one other electronic device on the display, and select and transmit the corresponding web code to the at least one other external device in response to a preset type of touch with respect to the selected at least one area and the icon corresponding to the at least one other electronic device.

5. The electronic device of claim 4, wherein the preset type of touch is a drag touch starting on the at least one area and ending on the icon.

6. The electronic device of claim 1, wherein the controller is further configured to stop displaying the screen information corresponding to the transmitted web code on the display when the corresponding web code is transmitted to the at least one other electronic device.

7. The electronic device of claim 1, wherein the controller is further configured to maintain a display state of the screen information corresponding to the transmitted web code on the display when the corresponding web code is transmitted to the at least one other electronic device.

8. The electronic device of claim 7, wherein the controller is further configured to:

when at least part of the execution screen displayed on the display changes, transmit another web code corresponding to the changed execution screen to the at least one other electronic device through the wireless communication unit, such that other screen information corresponding to the changed execution screen is displayed on the display of the at least one other electronic device.

9. The electronic device of claim 8, wherein the controller is further configured to limit the changed execution screen to a selected area among the plurality of areas.

10. The electronic device of claim 1, wherein the web code is executable on the web browser provided in the at least one other electronic device.

11. The electronic device of claim 10, wherein the web code is one of an HTML code, a Java Script code and a CCS code.

12. The electronic device of claim 1, wherein the controller is further configured to:

display a first icon corresponding to the first electronic device on the display, and display a second icon corresponding to a third electronic device on the display.

13. The electronic device of claim 12, wherein the controller is further configured to:

extract a web code of the screen information displayed on the display, and transmit the extracted web code to the third electronic device through the wireless communication processor such that the corresponding screen information is displayed on a display of the third external device in response to a selection of the second icon.

14. The electronic device of claim 1, wherein the controller is further configured to divide the execution screen into a plurality of areas including information having different attributes from one another, and wherein the web code includes a corresponding web code of at least one area of the plurality of areas.

* * * * *